(12) United States Patent
Klammer et al.

(10) Patent No.: US 6,263,080 B1
(45) Date of Patent: Jul. 17, 2001

(54) HOLDING DEVICE FOR A TELEPHONE UNIT

(75) Inventors: Wolfgang Klammer, Castrop-Rauxel; Jurgen Matthies, Witten; Reinhard Willsch, Bottrop, all of (DE); Sheldon Phillips, Agoura; Jonas H. Bourghardt, Ventura, both of CA (US); Dirk Schneider, Dortmund (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/204,833

(22) Filed: Dec. 3, 1998

(30) Foreign Application Priority Data

Dec. 5, 1997 (DE) ............................................. 197 54 115

(51) Int. Cl.⁷ ..................................................... H04M 1/00
(52) U.S. Cl. ........................................... 379/446; 379/455
(58) Field of Search .................................. 379/446, 454, 379/455, 430, 431

(56) References Cited

U.S. PATENT DOCUMENTS

| | | | |
|---|---|---|---|
| 5,457,745 | * 10/1995 | Wang | 379/454 |
| 5,761,611 | * 6/1998 | Doss-Desoura | 455/90 |
| 5,850,440 | * 12/1998 | Hannon et al. | 379/446 |
| 5,865,503 | * 2/1999 | Shields, Jr. | 297/188.14 |

FOREIGN PATENT DOCUMENTS 44 05 506 C2 * 8/1995 (DE) .

* cited by examiner

*Primary Examiner*—Jack Chiang
(74) *Attorney, Agent, or Firm*—Pearman & Green, LLP

(57) ABSTRACT

A holding device (1) for the accommodation, for example the clamping accommodation, of a telephone unit (18), in particular a handset of a car telephone or of a mobile telephone, has two side walls (2, 3) that are arranged at a distance from each other for positioning the telephone unit (18), the distance between the side walls (2, 3) being smaller than the width of the telephone unit (18), in order to accommodate the telephone unit (18) between them in a first position in which main faces of the telephone unit (18) are situated opposite the side walls (2, 3), and in order to store the telephone unit (18) in a second position, on longitudinal edges of the side walls (2, 3), in which the main faces of the telephone unit (18) are situated transversely with respect to the side walls (2, 3). The distance between the side walls (2, 3) advantageously corresponds at least approximately to the thickness of the telephone unit (18).

18 Claims, 4 Drawing Sheets

HOLDING DEVICE FOR A TELEPHONE UNIT

DESCRIPTION

BACKGROUND OF THE INVENTION

The invention relates to a holding device according to the preamble of patent claim 1 for the accommodation, for example the clamping accommodation, of a telephone unit, in particular of a handset of a car telephone or of a mobile telephone, having two side walls that are arranged at a distance from each other for positioning the telephone unit. The telephone unit is normally positioned between the side walls such that a main face of the telephone unit, that is to say a front or rear face of the telephone unit, comes to lie perpendicular to the side walls. The holding device therefore spreads out relatively far, which is disadvantageous in many cases, in particular when there is only little space available for the accommodation of the holding device, such as, for example, in the region of the central armrest of an automobile. It is then only possible to accommodate a few other things laterally beside the holding device, which often constitutes a deficiency.

The invention is based on the object of providing a holding device of the type cited at the beginning which occupies less space.

The achievement of the object stated is specified in the characterizing part of patent claim 1. Advantageous refinements of the invention are to be taken from the subclaims.

A holding device according to the invention is distinguished by the fact that the distance between the side walls is smaller than the width of the telephone unit, in order to accommodate the telephone unit between them in a first position in which main faces of the telephone unit are situated opposite the side walls, and in order to store the telephone unit in a second position, on longitudinal edges of the side walls, in which the main faces of the telephone unit are situated transversely with respect to the side walls.

As a result of the fact that the width of the holding device is now smaller than that of the telephone unit, it takes up less space, so that even in relatively narrow regions there is the possibility of being able to accommodate still further items of equipment besides the holding device, for example even a second holding device in order to store in the latter a mobile telephone, for example, while the handset of a car telephone is accommodated in the first holding device.

According to an advantageous development of the invention, the distance between the side walls of the holding device corresponds at least approximately to the thickness of the telephone unit. The thickness of the telephone unit is to be understood in this case essentially as that distance which is situated between the front main face and the rear main face of the telephone unit. As a result, the holding device can be designed to be even narrower.

According to a refinement of the invention, it is possible for the side walls of the holding device to run parallel to each other, so that the holding device itself has a straightforward construction and can be produced as straightforwardly as possible. However, the side walls can also be matched in their distance profile to the profile of the main faces of the telephone unit, in order to arrive at a still more compact holding device.

As also emerges from what was said at the beginning, it is possible for the telephone unit, if it is not intended to be used, to be lowered essentially completely in the holding device, the main faces of the telephone unit then being situated essentially opposite the side walls of the holding device. However, the inventive holding device also offers the possibility of storing the telephone unit on the holding device, if circumstances make this appear desirable and the available space does not contradict this. In order to arrive at a compact unit in this case, too, it is advantageous for the contour of the side wall longitudinal edges on which, in the second position, the telephone unit comes to lie with its one main face to be matched to the contour of this one main face.

According to a further refinement of the invention, in one end region of the side walls there is arranged a bracket that is fixed and points in the direction of the other end region of the side walls and projects beyond the side walls in the vertical direction to such an extent that it engages over one end of the telephone unit, which may be in either the first or the second position. By means of this bracket, so to speak, a counterbearing for the telephone unit is formed, against which said telephone unit is pressed more or less intensely when it is situated in or on the holding device. In this case, the end of the telephone unit that is pressed against the bracket is generally its lower end, that is to say the end which, in the case of a mobile telephone, is situated opposite the upper antenna end or the end from which, in the case of a handset for a car telephone, the line connection is led out.

Precisely in relation to the latter case, it is possible for said bracket also to have a central slot through which the cord that is led out of the handset is led when said handset is lying on the holding device.

In accordance with the invention, at least one latching tab that points toward said one end is arranged on said other end region of the side walls, for example on a pivotable end wall, and engages in an appropriate recess on that end of the telephone unit that is situated opposite it in order to fix the telephone unit to the holding device. In this case, in order to fix the telephone unit to the holding device, either in the first or in the second position, only a single latching tab can be used, this tab engaging in an appropriately positioned recess on that end of the telephone unit that is situated opposite it. However, it is also possible, given a different shape of the recess, to use two latching tabs that are located one above the other at a distance, both being arranged, for example, on said pivotable end wall. This would be conceivable in a case in which the recess is of elongate construction at the end of the telephone unit and is situated with its longitudinal direction parallel to one of the main faces of the telephone unit.

According to a very advantageous further development of the invention, a carrier which is intended for the telephone unit and which is pivotable and is pressed outward by a pressing force is arranged between the side walls. This carrier is, for example, continually pressed outward by a spring, it being possible for the pivoting movement of the carrier to be controlled or damped by a damping device. The carrier is used, for example, to lift the telephone unit upward from the side walls after it has been released by the latching tab. In this position of the carrier, the telephone unit may remain on it, in order to be able to grip it better when required. Expediently, the telephone unit should then at least continue to be guided on the moved-out carrier via guide elements, in order to prevent it falling out. The guide elements may be provided permanently on that main face of the telephone unit which is situated opposite the carrier, in order to co-operate with the carrier for holding purposes.

In a refinement of the invention, the carrier may have two carrier side walls which are situated at a distance from each other, this distance being selected such that it corresponds at least approximately to the thickness of the telephone unit in the region of the carrier.

The carrier thus acquires several functions. On the one hand, it does not prevent the telephone unit being inserted into the holding device when the telephone unit is in the first position. On the other hand, the carrier enables the telephone unit to be lifted from the holding device after said latching tab has been moved out of the end recess in the telephone unit. Thirdly, the carrier enables a positioning of the telephone unit in a position in which it is pivoted away from the holding device, in order to enable better access to the telephone unit.

In order to ensure a positioning of the telephone unit on the carrier in which said unit is pivoted away from the holding device, the distance of the carrier side walls from each other may be selected such that the engagement of guides that are arranged on a main face of the telephone unit is possible when the telephone unit is placed onto the carrier by way of this main face. The guides then nestle against the inner sides of the carrier side walls and thus prevent the telephone unit falling out of the carrier, specifically even when the carrier or the holding device is subjected to severe vibrations, since use can be made of a clamping action between the guides and the carrier side walls.

It is preferable if the contour of the carrier that points toward the telephone unit is selected such that, when the carrier is pivoted in, this contour is brought into coincidence, at least in some areas, with the contour of the side wall longitudinal edges, or does not project beyond this contour. This ensures that even when a carrier is used, the holding device and the telephone unit placed on it always form a compact unit.

In this case, the carrier may for example extend into internal recesses in the side walls, so that the distance of the carrier side walls from each other can correspond to the distance of the side walls of the holding device from each other.

In addition, the edges in the side walls which are obtained as a result of the internal recesses can then be used as a stop for the carrier when the latter is pivoted out by the pressing force, as a result of which the pivoting range of the carrier may be set in a straightforward manner.

The holding device may be mounted on a support by way of its individual parts, but is preferably also constructed as a separate structural unit with a base, in order to simplify the installation. In this case, a barrier, for example a flap that can be pivoted about a pivot, that can pivot freely and reaches the base with its free end may be arranged on that bottom end of the carrier which points toward the pivotable end wall, in order to prevent articles inadvertently getting under the carrier.

In principle, the holding device can be installed such that the base is situated virtually horizontally and the side walls vertically, or such that the base is situated vertically and the side walls horizontally. However, it is also possible to align the base and side walls vertically, for example in the case in which the telephone unit is intended to be held upright, for example on a wall.

BRIEF DESCRIPTION OF THE DRAWINGS

An exemplary embodiment of the invention is described in detail below with reference to the drawing. Identical parts are consistently provided with the same reference symbols. In the drawing.

DETAILED DESCRIPTION OF THE PREFERRED EMBODIMENTS

Figure 1:
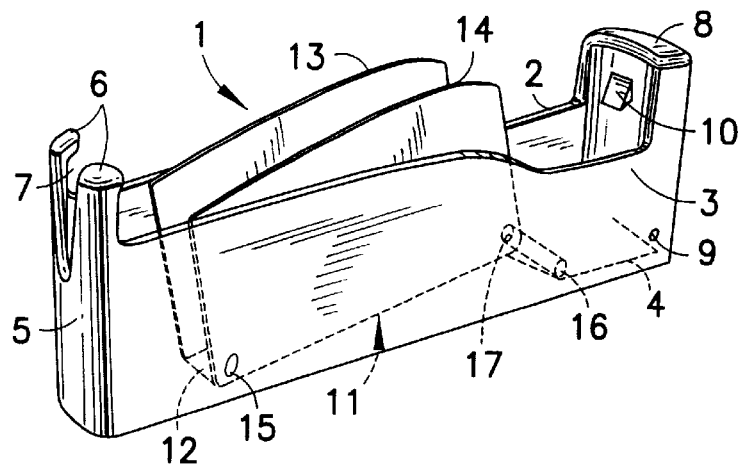
FIG. 1 shows a perspective view of the inventive holding device.

FIG. 1 shows an exemplary embodiment of a holding device according to the invention. The holding device carries the reference symbol 1 and has two side walls 2 and 3 that are situated at a distance parallel to each other and are connected to each other via a base 4. The side walls 2 and 3 are virtually perpendicular to the base 4. At one end of the side walls 2, 3 there is an end wall 5 that is permanently connected to the side walls 2, 3 and the base 4 and, in its upper region, which projects upward beyond the side walls 2 and 3, is bent over inward in order to form a type of bracket 6. A slot 7 projects from the top into the end wall 5, in order to enable the passage of a cable, as will be described further.

At the end region of the side walls 2, 3 that is situated opposite the end wall 5, there is a pivotable end wall 8. This pivotable end wall 8 is situated between the side walls 2 and 3 and, in its lower region, is pivotably mounted by means of a pivot 9 on the side walls 2 and 3. The pivot 9 runs parallel to the base 4. On the pivot 9 it is possible for a spring arrangement (not illustrated) to be mounted, with the aid of which the pivotable end wall 8 in FIG. 1 is pressed continuously in the counterclockwise direction about the pivot 9 against a stop (likewise not illustrated), in order to assume the position illustrated in FIG. 1. It is possible for the pivotable end wall 8 in FIG. 1 to be pivoted slightly about the pivot 9 in the clockwise direction against a further stop, in order to be able to pivot a latching tab 10 that is present on the inside of the pivotable end wall 8, as will also be further explained.

In the interior of the holding device 1 there is a carrier 11, which comprises a base 12 and two carrier side walls 13 and 14 that are situated parallel and at a distance from each other, are fastened to the base 12 and stick out perpendicularly from the latter. At the end of the base 12 that faces the fixed end wall 5, said base is pivotably mounted about a pivot 15, which is held by the side walls 2 and 3 and runs parallel to the base 4. The carrier side walls 13 and 14 nestle against the inner faces of the side walls 2 and 3. Put more precisely, the carrier side walls 13 and 14 are let into inside recesses in the side walls 2 and 3, with the result that the inner faces of the side walls 2 and 3 align with the inner faces of the carrier side walls 13 and 14.

Between the base 4 of the holding device 1 and the base 12 of the carrier 11 there is a compression-spring device (not illustrated) which continuously attempts to pivot the carrier 11 in FIG. 1 in the counterclockwise direction about the pivot 15. The outermost pivoting position in this direction of the carrier 11 is shown in FIG. 1. The pivoting movement is limited by the fact that the end edges of the carrier side walls 13 and 14 that point toward the fixed end wall 5 strike against the corresponding edges of the recesses, present in the side walls 2 and 3, for the carrier side walls 13 and 14. On the other hand, the pivoting movement of the carrier 11 in the clockwise direction about the pivot 15 in FIG. 1 is limited by the fact that the carrier 11 comes to rest with its base 12 on the base 4 of the holding device 1.

On the end of the base 12 of the carrier 11 that faces the pivotable end wall 8 there is a flap 16, which is articulated on said carrier and, for example, can be pivoted about a pivot 17 running parallel to the base 12. The free end of the flap 16 rubs continuously on the base 4, by which means the flap 16 can never rotate under the base 12. If the carrier 11 is pressed in the direction of the base 4, then the flap 16 is pivoted counterclockwise around the pivot 17 in FIG. 1, and finally comes to lie on the base 4. The flap 16 prevents articles inadvertently getting under the base 12 of the carrier 11.

All the abovementioned pivots 9, 15 and 17 could also be replaced by stub axles.

Figure 2:
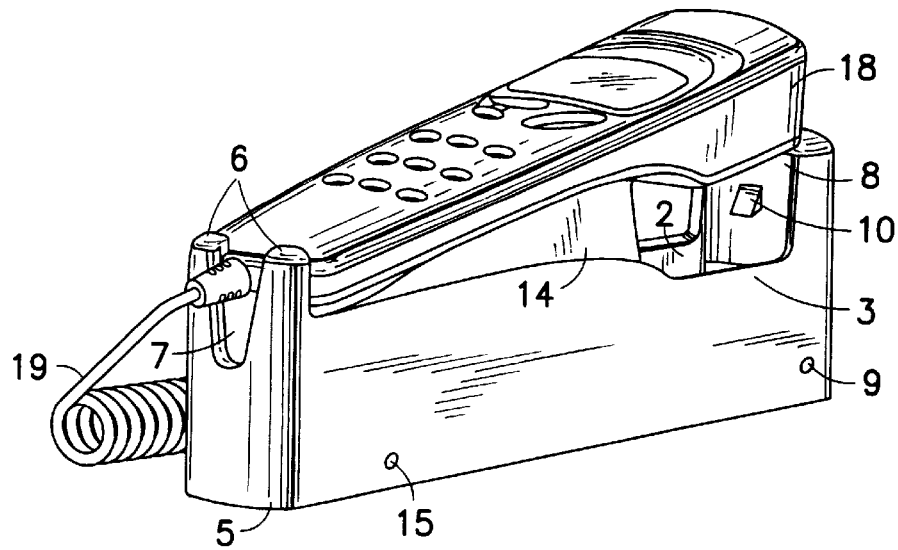
FIG. 2 shows the holding device according to FIG. 1 with the handset of a car telephone placed on it, the handset not being locked to the holding device and being located in its second position.

FIG. 2 shows the holding device according to FIG. 1 with the handset 18 of a car telephone placed on it, said handset not yet being locked to the holding device. The handset 18 is located in FIG. 2 in its so-called second position, in which the main faces of the handset 18 run essentially transversely or perpendicularly with respect to the side walls 2 and 3. Here, the main faces are the faces containing the operating and display devices of the handset 18, that is to say its front side and its rear side.

According to FIG. 2, the handset 18 rests with its main face pointing toward the holding device firstly on the upper end edges of the carrier side walls 13 and 14, which, viewed in the longitudinal direction of the holding device 1, are situated approximately centrally in relation to the holding device 1. At the lower end of the handset 18, that is to say where it is connected to a telephone cord 19, the handset 18 rests with its main face on the end edge regions of the side walls 2 and 3 that are adjacent to the fixed end wall 5, while on the other hand it is supported by way of its lower end wall on the upper part of the fixed end wall 5. At the same time, the brackets 6 engage over the handset 18 in this region to a certain extent. Put more precisely, the vertical distance of the inwardly pointing brackets 6 from the respective end edges of the side walls 2 and 3 adjacent to the end wall 5 corresponds at least approximately to the thickness of the handset 18 at its lower end. The telephone cord 19 which comes out there is led through the slot 7.

In this state, the handset 18 is held raised by the holding device 1, since the spring device (not illustrated) between the base 4 and base 12 of the carrier 11 continuously attempts to press the latter upward or outward. As a result of the spring force, the weight of carrier 11 and handset 18 are overcome, so that the state shown is maintained. In order to prevent the handset 18 falling out of the carrier 11 in this position, it is possible for additional longitudinal webs to be provided on that main face of the handset 18 which points toward the carrier 11, these webs coming to lie between the carrier side walls 13 and 14 and nestling on their insides in a clamping manner.

Figure 3:
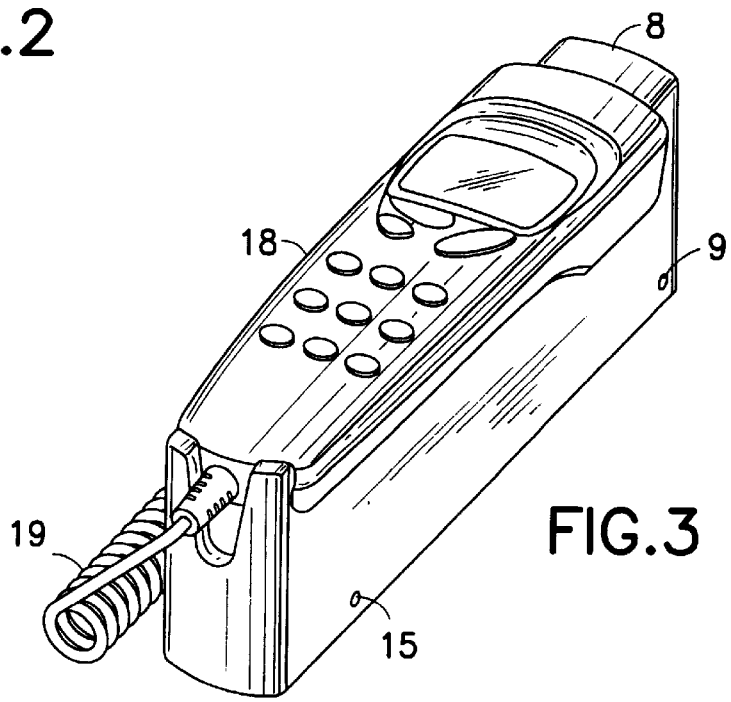
FIG. 3 shows an illustration corresponding to FIG. 2, but the handset is now locked.

If the handset 18, which is pointing upward in FIG. 2, is pressed in the direction of the holding device 1, then the state according to FIG. 3 is obtained. During this operation, the carrier 11 is pivoted in the clockwise direction about the pivot 15 in FIG. 2, specifically counter to the force of the spring arrangement that is situated between its base 12 and the base 4, until said carrier is finally completely lowered into the holding device and the handset 18 can also be supported on further end edge regions of the side walls 2 and 3. In this case, the contour of the end edges of the side walls 2 and 3 is matched to the contour of that main face of the handset 18 which points toward it, so that when the handset 18 is pressed down, a largely self-contained or compact unit is provided.

During said pressing down of the handset 18, the latter remains with its lower end underneath the bracket 6 and finally, with its end wall situated opposite this end, presses the pivotable end wall 8 outward about the pivot 9 via the latching tab 10. If the handset 18 is pressed still further down, the latching tab 10 finally latches into a recess (not illustrated) on the end of the handset 18 that is situated opposite, in order thus to lock the handset 18 to the holding device 1. At the same time, latching tab 10 and/or end wall 8 press the handset 18 against the bracket 6.

Figure 4:
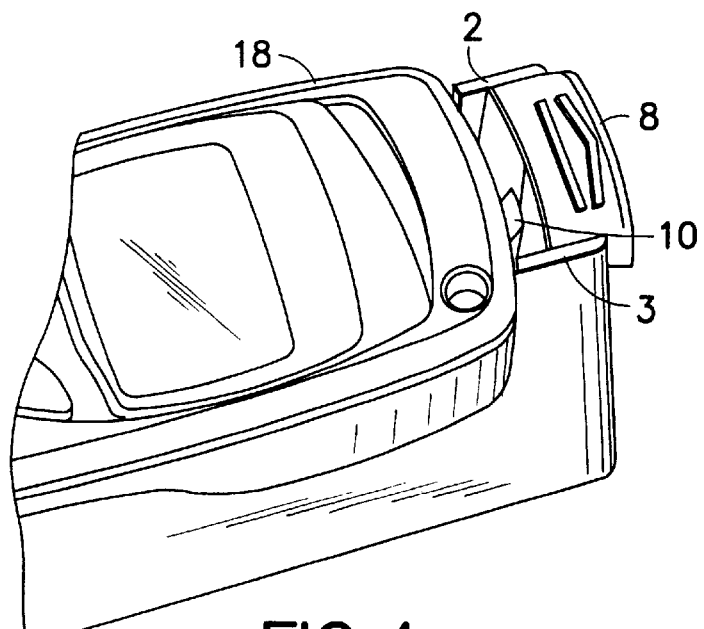
FIG. 4 shows an enlarged partial illustration from FIG. 3 in the region of the latching tab.

FIG. 4 reveals that the locking state can be cancelled again by it being possible for the upper part of the pivotable end wall 8 to be actuated using finger or thumb, in order to pivot the end wall 8 outward and hence to guide the latching tab 10 out of said recess. Then, as a result of the spring force, the carrier 11 is pressed outward and with it the handset 18. This pivoting movement may proceed in a speed-controlled manner, specifically with the aid of a damping element controlling the spring force.

Figure 5:
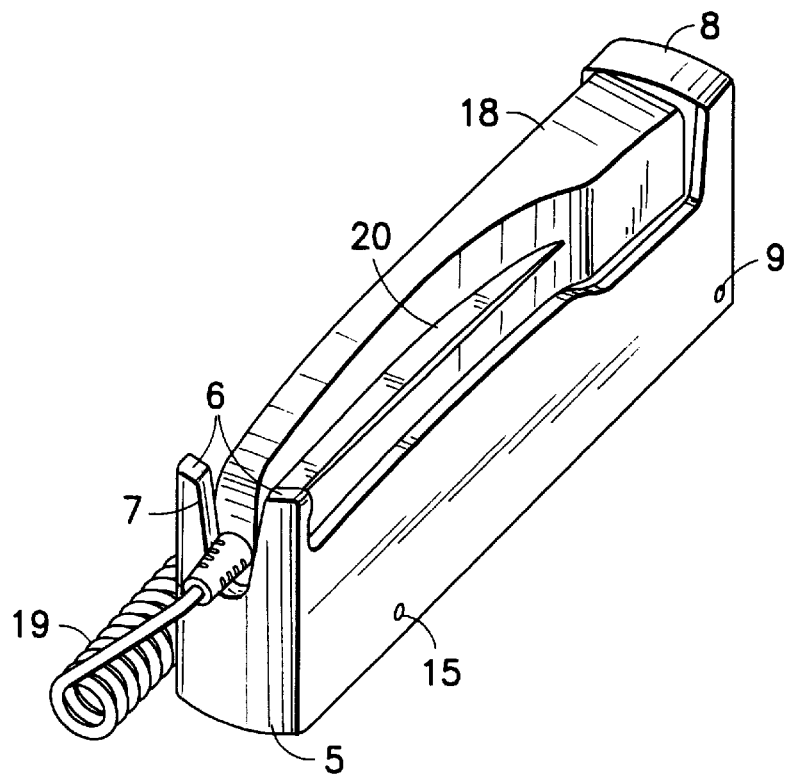
FIG. 5 shows a perspective view of a holding device with a handset locked therein, said handset being in the first position.
Figure 6:
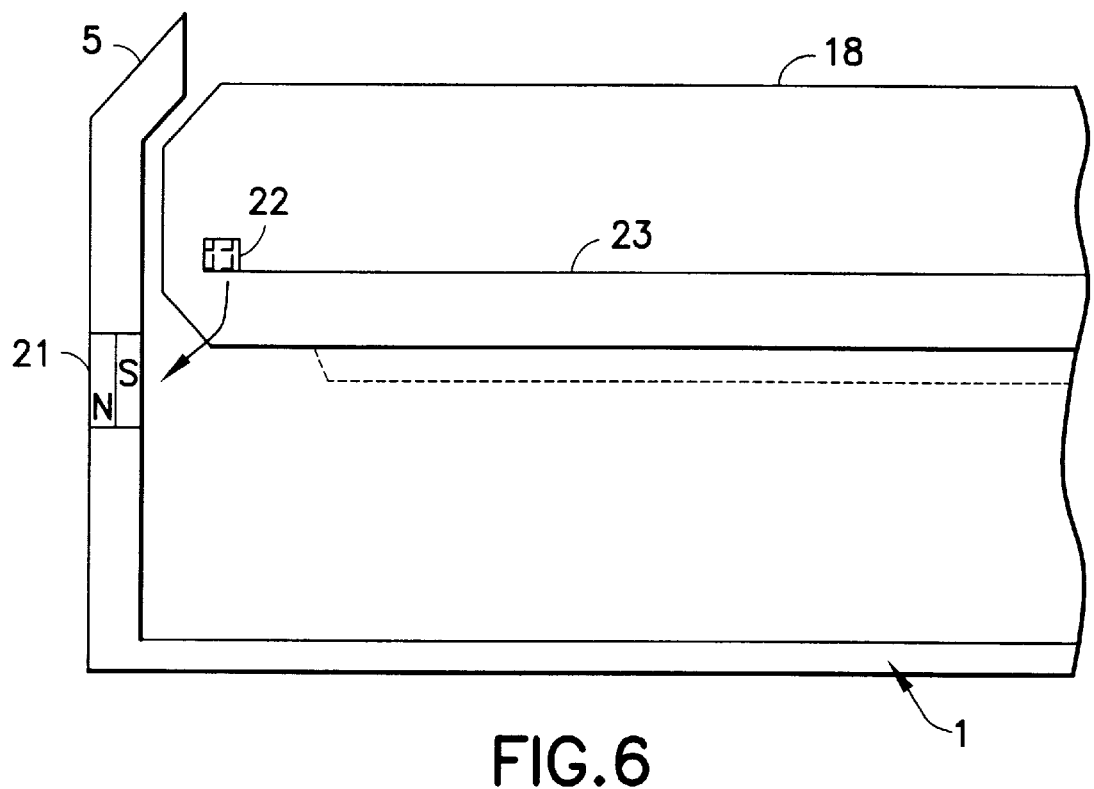
FIG. 6 shows a longitudinal section through the holding device and telephone unit, equipped with permanent magnet and Hall-element switch, the telephone unit being situated in the second position.
Figure 7:
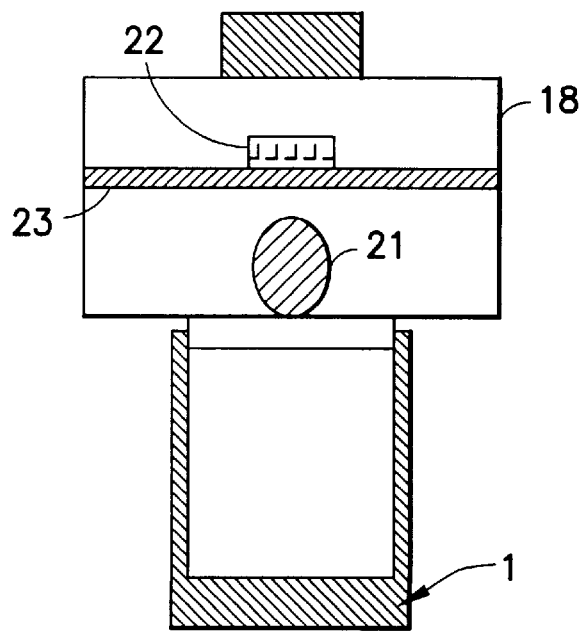
FIG. 7 shows a cross section through the telephone unit in the region of the Hall-element switch, the telephone unit being situated in the second position.
Figure 8:
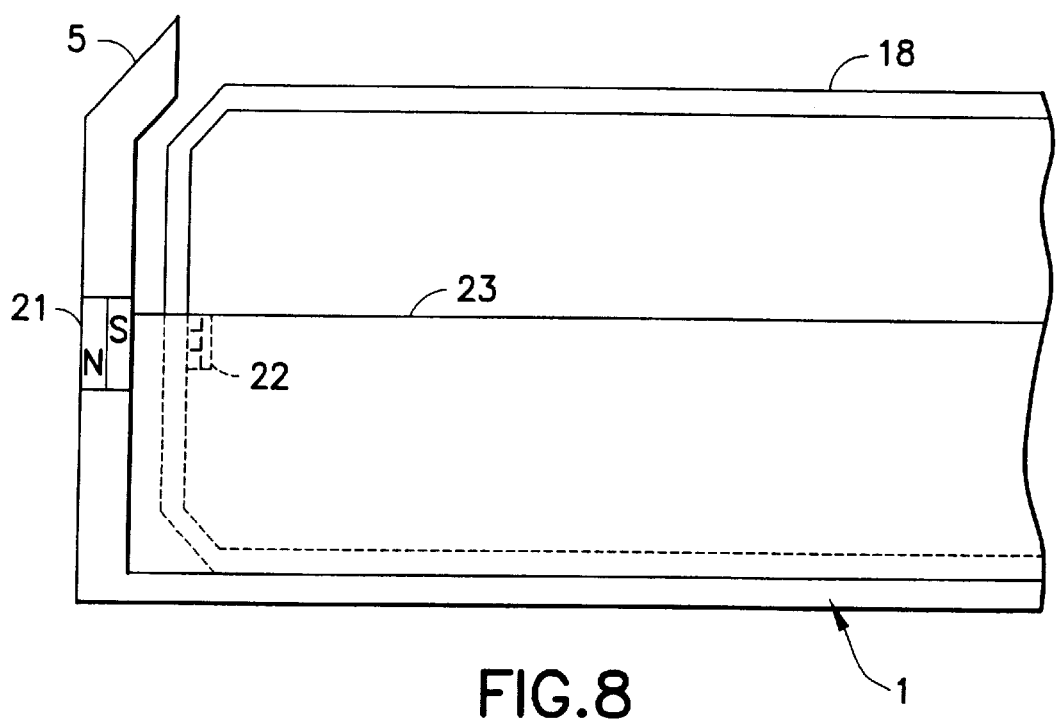
FIG. 8 shows a longitudinal section through the holding device and telephone unit, equipped with permanent magnet and Hall-element switch, the telephone unit being situated in the first position.
Figure 9:
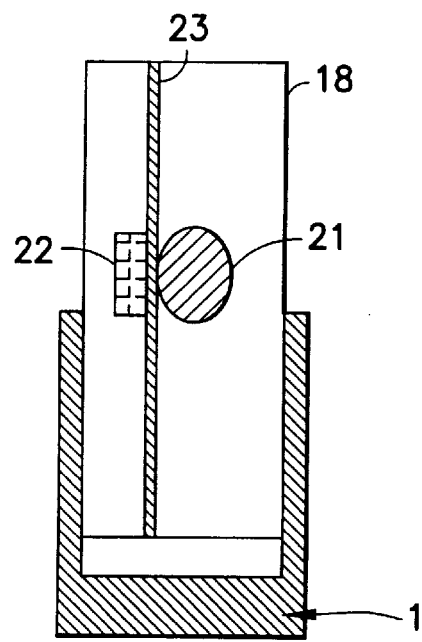
FIG. 9 shows a cross section through the telephone unit in the region of the Hall-element switch, the telephone unit being situated in the first position.

FIG. 5 shows the same holding device 1 as FIG. 1, but the handset 18 inserted into the holding device 1 is now located in a so-called first position. In this position, the main faces of the handset 18, that is to say its front and its rear side, are situated opposite the respective side walls 2, 3. Here, the carrier 11 has been moved completely into the holding device 1. The latching tab 10 on the inside of the pivotable end wall 8 engages in the corresponding recess on the upper end face of the handset 18 and, as is also the case in FIG. 3, presses the latter against the fixed end wall 5, with the result that the upper end of the handset 18 is held underneath the bracket 6. The handset 18 rests with one of its side faces on the base 4 of the holding device 1 and on the base 12 of the carrier 11. At the same time, the vertical distance between the inwardly pointing brackets and the base 4 of the holding device 1 is selected such that it virtually corresponds to the width of the handset 18 at its lower end. The telephone cord 19 also projects outward once more through the slot 7.

If, in FIG. 5, the pivotable end wall 8 is pivoted outward with the aid of thumb or finger, then the latching tab 10 releases the handset 18, with the result that the carrier 11 and with it the handset 18 can be pivoted out. The handset 18 can then be removed from the holding device 1.

It is of course possible for a different telephone unit to be inserted into the holding device 1 or placed on the latter instead of the handset 18, provided the dimensions essentially agree. The telephone unit may also be, for example, a mobile telephone or the like.

FIG. 5 also further reveals the guides 20 that extend in the longitudinal direction of the telephone unit, were already previously explained and are used for securing the telephone unit on the carrier 11 when the latter is pivoted out.

In a modification of the exemplary embodiments described above, the holding device can also be constructed such that, in an end region of the side walls, there are pins or attachments which are fixed, point in the direction of the other end region of the side walls and engage in that end of the telephone unit that faces them when the latter is situated in either the first position or in the second position. These pins can then engage in recesses which are located, for example, on the end face of the telephone unit that is situated opposite them. If the telephone unit is situated in the second position, it is possible for two pins to be arranged at a distance from each other on a line which extends parallel to the base 4. Furthermore, at this end there is a further pin on a central vertical line in the vicinity of the base 4, and this pin engages in a corresponding end recess in the telephone unit when the latter is located in the first position within the holding device. In any case, there are only two recesses for the pins in the telephone unit, to be specific to the left and right of the connection for the cable 19.

FIGS. 6 to 9 show, in each case in longitudinal and in cross section, the holding device with telephone unit 18 in the second and first position, respectively, within the holding device. Arranged in the end wall 5 of the holding device 1 is a permanent magnet 21, whose magnetic field lines also run into the interior of the holding device 1. At that end of the telephone unit 18 which adjoins the end wall 5, a Hall-element switch 22 is situated in said telephone unit 18, located on a circuit board 23. This Hall-element switch 22 is always acted on by the magnetic field of the permanent magnet 21 when the telephone unit 18 is situated in the second or first position within the holding device 1 or is lying in the second position on the carrier 11. Alternatively, it would also be possible to arrange the permanent magnet and Hall-element switch at the respectively opposite end walls of holding device 1 and telephone unit 18, that is to say in the region of the end wall 8 and that wall of the telephone unit 18 located opposite said end wall 8.

By means of the Hall-element switch 22, it is possible to detect whether the telephone unit 18 of a car telephone or of a mobile telephone is situated in the holding device. For this purpose, it is not absolutely necessary to align the positions of permanent magnet 21 and Hall-element switch 22 with each other exactly, as is the case when using conventional reed relays. The Hall-element switch 22 is therefore particularly suitable to be used in the present invention, since it is possible here for the telephone unit 18 to be positioned in two different positions in or on the holding device 1.

The Hall-element switch can, on the one hand, signal the fact that, in the event of an incoming call, the telephone unit 18 has been taken out of the holding device 1, and therefore the call has been accepted. On other hand, in the case of a telephone apparatus, is possible to change over from the telephone unit to a hands-free system, as soon as the telephone 18 has been put back into the holding device 1.

What is claimed is:

1. A holding device for accommodating a telephone unit, in particular a handset of a car telephone or of a mobile telephone, the device having two side walls that are arranged at a distance from each other for positioning the telephone unit, wherein the distance between the side walls is smaller than the width of the telephone unit, in order to accommodate the telephone unit between them in a first position in which main faces of the telephone unit are situated opposite the side walls, and in order to store the telephone unit in a second position, on longitudinal edges of the side walls, in which the main faces of the telephone unit are situated transversely with respect to the side walls.

2. A holding device according to claim 1, wherein the distance between said side walls corresponds at least approximately to the thickness of the telephone unit.

3. A holding device according to claim 1, wherein said side walls run parallel to each other.

4. A holding device according to claim 1, wherein the contour of the side wall longitudinal edges on which, in the second position, the telephone unit comes to lie with its one main face is matched to the contour of this one main face.

5. A holding device according to claim 1, wherein in one end region of said side walls there is arranged a bracket that is fixed and points in the direction of the other end region of the side walls and projects beyond said side walls in the vertical direction to such an extent that it engages over one end of said telephone unit, which may be in either the first or the second position.

6. A holding device according to claim 5, wherein said bracket has a central slot.

7. A holding device according to claim 5, wherein at least one latching tab that is pivotable and points toward said one end is arranged on said other end region of said side walls.

8. A holding device according to claim 1, wherein a carrier which is pivotable and is pressed outward by a pressing force is arranged between said side walls.

9. A holding device according to claim 8, wherein the movement of said carrier is damped by a damping device.

10. A holding device according to claim 8, wherein said carrier has two carrier side walls which are situated at a distance from each other, this distance being selected such that it corresponds at least approximately to the thickness of said telephone unit in the region of said carrier.

11. A holding device according to claim 10, wherein the distance of said carrier side walls from each other is selected such that the engagement of guides that are arranged on a main face of said telephone unit is possible when said telephone unit is placed onto said carrier by way of this main face.

12. A holding device according to claim 8, wherein the contour of said carrier that points toward said telephone unit is selected such that, when said carrier is pivoted in, this contour is brought into coincidence, at least in some areas, with the contour of the side wall longitudinal edges, or does not project beyond this contour.

13. A holding device according to claim 8, wherein said carrier extends into internal recesses in said side walls.

14. A holding device according to claim 13, wherein edges of said side walls which are obtained as a result of the internal recesses serve as a stop for said carrier when the latter is pivoted out by the pressing force.

15. A holding device according to claim 1, wherein said device is constructed as a separate structural unit with a base.

16. A holding device according to claim 15, wherein a barrier, in particular a flap, that can pivot freely and reaches said base with its free end is arranged on that bottom end of said carrier which points toward the pivotable end wall.

17. A holding device according to claim 5, wherein in an end region of said side walls there are pins or attachments which are fixed, point in the direction of the other end region of said side walls and engage in that end of said telephone unit which faces them when the latter is situated in either the first position or in the second position.

18. A holding device according to claim 1, wherein a permanent magnet is arranged in or on one of its end walls and is operatively connected to a Hall-element switch when said telephone unit is situated in the first or second position.

* * * * *